(12) United States Patent
Zbinden

(10) Patent No.: US 7,146,082 B2
(45) Date of Patent: Dec. 5, 2006

(54) STEERING ISOLATOR FOR AN OPTO-ELECTRONIC ASSEMBLY FOCUSING APPARATUS

(75) Inventor: Eric Zbinden, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/744,489

(22) Filed: Dec. 23, 2003

(65) Prior Publication Data

US 2005/0135751 A1    Jun. 23, 2005

(51) Int. Cl.
G02B 6/42    (2006.01)
(52) U.S. Cl. ............................. 385/50; 385/52
(58) Field of Classification Search ............ 385/50
See application file for complete search history.

(56) References Cited

U.S. PATENT DOCUMENTS

| | | | |
|---|---|---|---|
| 5,619,609 A | 4/1997 | Pan et al. | |
| 6,512,642 B1* | 1/2003 | Bourcier et al. | 359/813 |
| 6,571,041 B1* | 5/2003 | Bourcier et al. | 385/52 |
| 6,720,582 B1 | 4/2004 | Miyokawa et al. | |
| 6,886,993 B1 | 5/2005 | Verdiell et al. | |
| 6,890,106 B1 | 5/2005 | Verdiell et al. | |
| 6,905,354 B1 | 6/2005 | Zbinden | |
| 2005/0008298 A1* | 1/2005 | Sullivan et al. | 385/52 |

\* cited by examiner

*Primary Examiner*—Sung Pak
*Assistant Examiner*—Tina M. Wong
(74) *Attorney, Agent, or Firm*—Marshall, Gerstein & Borun LLP

(57) ABSTRACT

An optical device includes an apparatus for laterally shifting an optical beam. The optical device may be used in a focusing apparatus coupling an optical beam from a source waveguide to a receiving waveguide. The device may be an optical isolator that is mounted on supports that are slidably engaged with one another. The engagement may be at curved surfaces, to allow one support to rotate relative to the other. By rotating the optical isolator, a beam from the source waveguide and focused through the isolator may be selectively steered to couple it into the second waveguide. Such beam steering may be useful where the second waveguide has been misaligned from its optimum location. The beam steering may also be used to correct for post-weld displacement, where a lens of the focusing apparatus or other optical component has been misaligned during assembly. By using a rotating isolator, instead of the common multi-lens focusing apparatus, the coupling between source and receiving waveguides is far less susceptible to device alignment shifts.

25 Claims, 10 Drawing Sheets

Compared Effect on Coupling Efficiency in Function of MOFA and Steering Isolator Post Weld Shifts — · — · — Coupling loss vs. isolator angular post weld shift ———— Coupling vs. lens ated to avoid performance degradation. The need for heat dissipating support structures prevents the mounting of optical chips onto compliant structures that allow for chip movement or chip location adjustability. Instead of a compliant structure, these chips are mounted directly to a heat sinking substrate, typically via a pick-and-place assembly in which the locations of the chips have already been pre-programmed. Because the chips are usually assembled first into the device and their position accuracy is dependant on the dimensional accuracy of various components and the accuracy of the placement process, the free space optics coupling beams between chips must be positioned based on the actual locations of the chips.

STEERING ISOLATOR FOR AN OPTO-ELECTRONIC ASSEMBLY FOCUSING APPARATUS

TECHNICAL FIELD

This disclosure relates generally to coupling of an optical beam and, more particularly, to methods and structures for laterally shifting or "steering" an optical beam.

BACKGROUND OF THE RELATED ART

Free space optics are commonly used to couple optical beams between two pre-positioned waveguides. Take for example chip-to-chip coupling, where a first optical chip such as a laser produces a beam that is to be coupled to a second optical chip such as a modulator. In such an environment, the free space optical couplers are discreet optical elements positioned between the chips. Although common, accurate free space coupling in this manner is very difficult to achieve. And, as more and more optical chips are integrated into a single optical module or device, the desire for free space optics systems that allow quick, reliable and affordable coupling between waveguides greatly increases. Unfortunately, current assembly techniques have many shortcomings.

In a typical chip-to-chip assembly, the optical chips need to have a direct path for thermal heat dissipation. Laser diodes in particular dissipate power that must be evacuated to avoid performance degradation. The need for heat dissipating support structures prevents the mounting of optical chips onto compliant structures that allow for chip movement or chip location adjustability. Instead of a compliant structure, these chips are mounted directly to a heat sinking substrate, typically via a pick-and-place assembly in which the locations of the chips have already been pre-programmed. Because the chips are usually assembled first into the device and their position accuracy is dependant on the dimensional accuracy of various components and the accuracy of the placement process, the free space optics coupling beams between chips must be positioned based on the actual locations of the chips.

So, not only are the free space optics positioned to receive the optical beam from the actual location of a first chip, these optics are positioned to focus that optical beam onto the actual location of the second chip. If, during assembly, the free space optical components are shifting from their optimal positions, chip-to-chip coupling efficiency is greatly reduced and device performance will be severely hampered. Such misplacement or misalignment of the free space optics can result from numerous factors, including inaccurate initial optical components placement due, for example, to accuracy limitations of the pick-and-place assembly tooling. Misalignment may also be affected by process shifts such as post-weld shift or epoxy curing shift, e.g., the shifting of the optical component due to laser welding or epoxy curing that is typically used to affix these structures to a support substrate.

Some free space optics techniques using a combination of strong and weak lenses have been developed. Although somewhat well-suited for chip-to-chip coupling, these technologies are sub-optimal in that they require very precise alignments of all optical chips, which add considerably to the fabrication cost. Using strong and weak lenses also results in rather bulky optical devices.

FIG. 1 shows a side view of an existing strong and weak lens coupling apparatus 100. Two waveguides, one of a laser diode 102 and the other of a modulator 104, are coupled together through a strong lens 106 and a weak lens 108. The strong lens 106 and the weak lens 108 form a free space optics system 109. An optical isolator 110 is placed in the optical path between the two lenses 106 and 108 to prevent back-reflected light from entering the laser diode 102.

The ratio of the displacement of the beam waist to the displacement of the strong lens 106 is large, by design. Also, the ratio of the displacement of the beam waist to the displacement of the weak lens 108 is small (i.e., large lens motion→small beam waist motion). In other words, the movement of the weak lens 108 has a lesser effect on the location of the focused optical beam from the laser 102 than does the movement of the strong lens 106. The laser diode 102 and the modulator 104 are mounted on their own submounts 112 and 114, respectively. The strong lens 106 and the isolator 110 may be mounted on micro-flexure 116 and the weak lens 108 on a micro-flexure 118. The two micro flexures 116 and 118 are attached to a weld plate 120.

The assembly process for the device 100 is typically as follows. The submounts 112 and 114 and the chips 102 and 104 are bonded to the substrate at substantially predefined locations. The strong and weak lenses 106, 108, respectively, are aligned simultaneously and the coupling between the two waveguide (chips) is maximized. The alignment step is complicated, because alignment must be optimized for 6 degrees of freedom, all at once. After alignment, the strong lens 106 is attached, and any shift of the strong lens 106 during the attachment process, i.e., post-weld shift, will shift the focus point of the system 109, thereby significantly reducing the coupling efficiency. The weak lens 108 is then realigned so that the focus point is re-centered on the coupled waveguide (a modulator for example) 104, so coupling efficiency is improved. This process may or may not achieve maximum coupling between the devices 102 and 104, however. The misalignment of the strong lens 106 may permanently degrade beam coupling. In any event, after the re-centering, the weak lens 108 is then attached. And, here, a shift of the weak lens 108 would result in an additional shift of the focus point and further coupling loss. In part because the lens 106 and 108 have curved surfaces, for either of the lens the amount of focus point shift as a result of lateral movement of the lens is substantial.

DETAILED DESCRIPTION OF THE PREFERRED EXAMPLE

The described examples relate to alternate solutions for focusing an optical beam from one waveguide to another. The devices are adjustable couplers and, thus, may be quite useful in environments having pre-positioned waveguides or environments where the position of the waveguides may vary from one part to the next. By adjusting the coupler after the assembly of the waveguide the coupling efficiency may be maximized or set to any desired default coupling.

Commonly, an optical isolator is used in an optical device to prevent back-reflection of light into a laser source or input waveguide. The optical isolators may come in numerous forms, one form being a Faraday rotator sandwiched between two polarizers having differently-oriented polarization axes. As one of ordinary skill in the art will appreciate, an isolator may comprise a magnet to create a magnetic field that rotates the polarization of light traveling through the faraday rotator.

As shown herein, any optical isolator may be used as an adjustable coupler. Further, the optical isolators may be positioned between waveguides, e.g., waveguides of different optical chips, and rotated in various directions to achieve a desired coupling. In an example, angular rotation over an entire spheroid section is achievable. Rotation may be pitch, yaw, or roll in nature. Further, translation of the optical isolators, as might occur during the assembly process, does not alter device performance. By using an optical isolator as a beam-steering mechanism, the number of components is reduced, as is the number of alignments that must be made to optimize coupling. Further, the overall size of the free space focusing apparatus is reduced.

Figure 2:
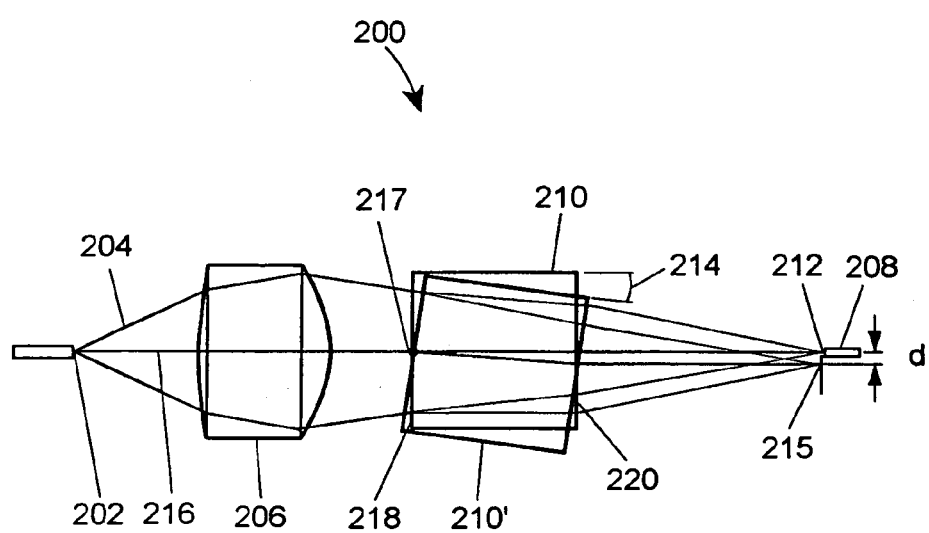
FIG. 2 is a top illustration of an optical isolator in accordance with an example.

FIG. 2 shows a top view of a two-dimensional representation of an adjustable optical isolator apparatus 200. A laser source 202 emits a divergent beam 204. The beam 204 is focused by a lens 206 onto a second waveguide 208 through an isolator 210, in a first position. The isolator 210 is also shown in a second position using the reference numeral 210'. In the first position, the beam 204 is focused by the lens through the isolator 210 onto a focus point 212 at the waveguide 208. By rotating the isolator 210 an angle 214, to the isolator position 210', the beam 204 walks off a distance, d, from the focus point 212 onto a second focus point 215. The walk-off is along an arc, but may be considered a linear, or lateral, walk-off for small values of angle 214. By convention, the rotational movement shown in FIG. 2 is a yaw rotation (from the top view) about an axis coming out of the illustration. The pitch rotation results in a walk-off along a direction, y, again by convention.

The isolator 210 may be rotated about a number of axes, in the illustrated example. A first axis 216 extends from the laser source 202 to the coupled waveguide 208. Rotation around that axis (roll) has no effect on the position of the focus point, but allows alignment of the polarization of the laser beam with the input polarization plane of the isolator. The isolator 210 is rotatable about a second axis 217 that lies in a plane (coming out of the illustration) substantially perpendicular to the first axis 216. The second axis 217 may be one of any number of axes in this plane and, as explained further below, may allow for pitch, or yaw rotation of the isolator 210 relative to the device 202 inducing a walk off of the focal point.

The device 200 shows beam steering using only a lens and an isolator apparatus. The lens 206 may be any type of lens and may be positioned at a focal distance from the laser source 202. The isolator 210 is essentially cubic in shape, having a flat entrance or incidence face 218 and a parallel exit face 220. The isolator 210 is formed of a sandwich of optically transparent material such as faraday rotator glass and light polarizing material with an index of refraction substantially different than the surrounding atmosphere. The isolator 210 refracts the light incident upon it from the lens 206 to achieve the desired steering walk-off for coupling into the second waveguide 208. The isolator 210 may include an anti-reflection surface, such as a coating or polarizer pair, for blocking back reflections.

EXAMPLE 1

In an example fabrication, the device 200 may have a magnification of 2:1 with a 1.6 mm thick double stage optical isolator as the isolator 210 and a half beam width (HW) at $1/e^2$ of 30° and 15° for the laser and modulator respectively. The distance between the waveguides 202 and 208 is approximately 5.0 mm. In this example, the beam waist lateral displacement is 14.5 µm per degree of rotation of the isolator 210. If a single stage isolator 210 is used, then the beam waist displacement may be 8.2 and 6.3 µm per degree of rotation of the isolator for 1550 and 1310 nm central wavelengths, respectively (assuming a 0.9 and 0.7 mm isolator thickness respectively). The lateral displacement of the focus point is a function of the optical isolator angle 214, isolator thickness and isolator refractive index.

Figure 3:
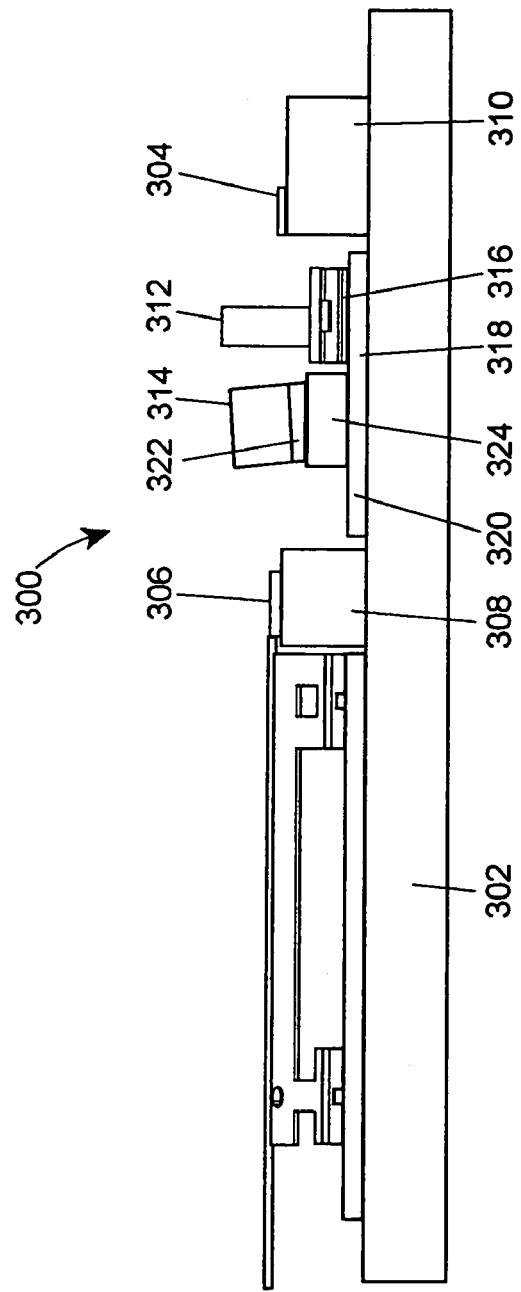
FIG. 3 is a side view of an optical module including an optical isolator coupled between two optical chips.
Figure 4:
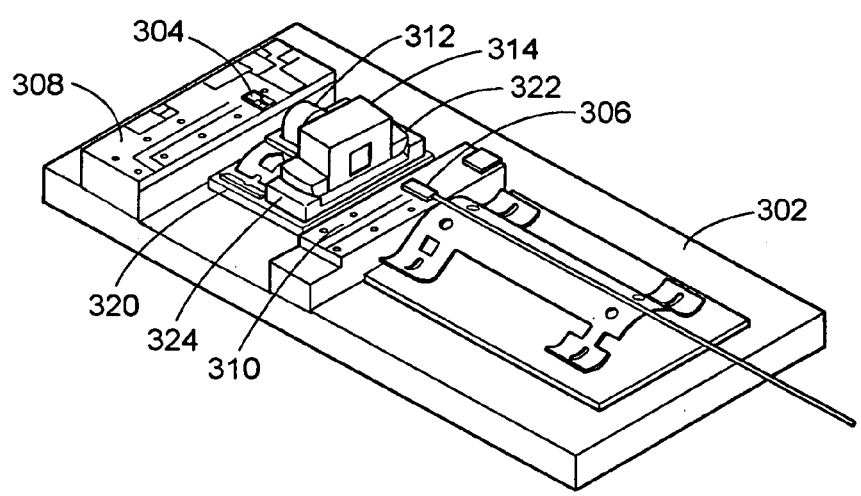
FIG. 4 is a perspective view of the structure of FIG. 3.

FIGS. 3 and 4 show an example optical device 300 employing a rotational isolator for beam steering. A substrate 302 supports two optical components, one a laser diode 304 and the other an electro-absorption modulator 306 each mounted on its own substrate 308 and 310, respectively. The focusing apparatus of the device 300 includes a single lens 312 and an optical isolator 314 that is rotationally adjustable. The lens 312 is mounted on a micro-flexure 316 fixed on a welding platform 318. The optical isolator 314 is mounted to an isolator support assembly 320 that includes a first support 322 and a second support 324.

EXAMPLE 2

Figure 1:
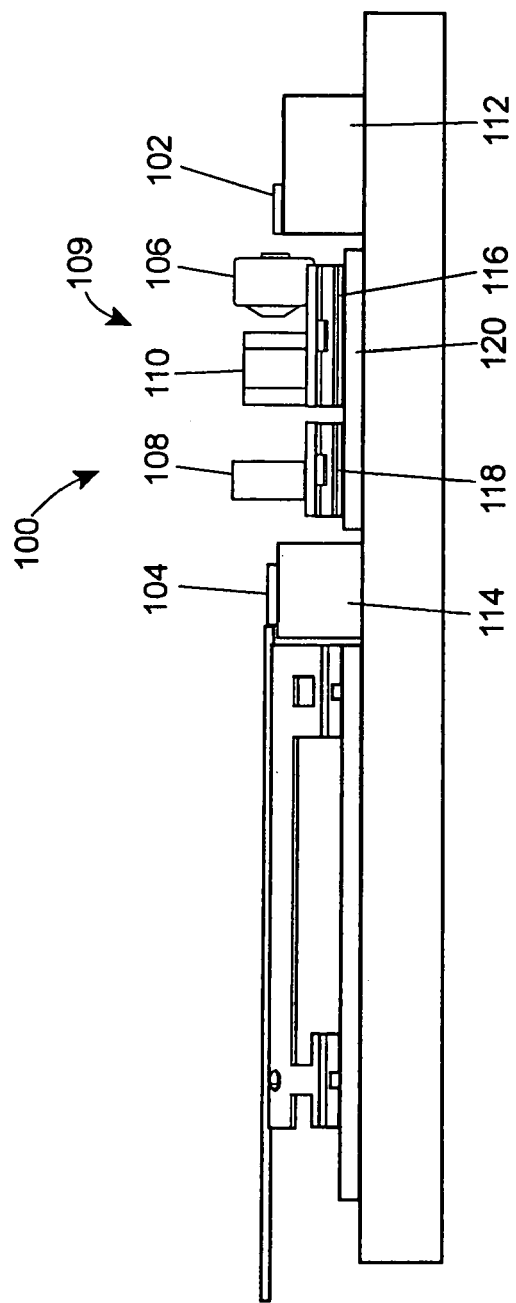
FIG. 1 is a side illustration of a prior art free space coupling system using a strong and weak lenses apparatus.

An example assembly process for the device 300 is now described. The laser diode 304, the modulator 306, the sub-mounts 308 and 310, the substrate support 324, the weld platform 318, and the second support 324 are assembled using passive pick-and-place techniques. The lens 312 and the isolator assembly 320 are then pre-positioned. The isolator's optical axis is roughly aligned to be normal to the optical axis of the device. The lens 312 is aligned in the XYZ directions until the maximum coupling between the two optical devices 304 and 306 is reached. The lens 312 is then fixed in position. To correct for any post-weld shift of the lens 312 as it is affixed in place, the isolator 314 is finely rotated to re-optimize the coupling between the devices 304 and 306. For example, the second support 324 may be fixed on the weld platform 318, and the first support 322 rotated relative to the second support 324. The first support 322 is fixed in place on the second support 324, for example, by laser welding, after the desired coupling has been achieved. Using this alignment technique allows for faster alignment times because the degrees of freedom of alignment are reduced from that of a strong and weak lens apparatus, such as that shown in FIG. 1. Additionally, an alignment technique using rotational movement to achieve beam steering is better suited to minimize post-weld shift effects because the steering apparatus itself is quasi-insensitive to translational motion of the isolator. The rotational error due to post weld shifts is minimized by the large baseline between attachment points.

FIGS. 5–8 illustrate an example isolator support assembly 400 that may be used as the assembly 320. To achieve a rotational movement like that depicted in FIG. 2, the assembly 400 includes a first support 402, having a compliant (first) surface 404, and a second support 406, having a receiving (second) surface 408. The supports 402 and 406 form an isolator mount assembly 409. In the illustrated example, the second support 406 houses at least one portion of the first support 402, with the compliant surface 404 and the receiving surface 408 being in slidable contact with one another. That slidable contact may be of any form that allows rotational movement of the first support 402 relative to the second support 406. With the second support 406 having a fixed position, for example, being rigidly mounted to a substrate, an optical isolator 410 mounted in a recess 412 of the first support 402 is rotationally adjustable to steer an optical beam to achieve a desired walk-off and, therefore, a desired optimum coupling between waveguides.

Figure 6:
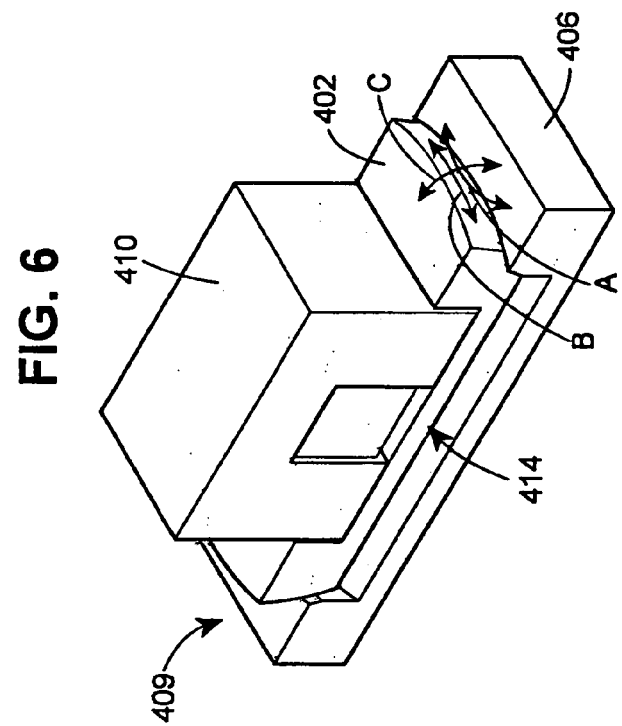
FIG. 6 is an illustration of the optical isolator of FIG. 5 in a partially unassembled form.

In operation, optimum coupling may require that a beam walk-off in X and Y directions at the focus plane. The assembly 400, therefore, allows for beam steering across the entire focus plane where the second waveguide is disposed. Over small walk-offs, the focus plane may be considered a flat plane approximating a spherical surface. To achieve, full rotational movement, the compliant surface 404 and the receiving surface 408 are both spherical surfaces. The first support 402 is supported by the receiving surfaces 408, which suspend the first support over an opening 414. The receiving surface 408 is a bevel curved surface in the illustrated example and supports the first support 402 over the opening 414 in the second support 406. The bevel surface is provided at an upper region 407a and 407b of the support 406, and when assembled an upper portion 405a and 405b of the support 404 may extend above the upper surface 407a and 407b, as shown in FIG. 6. In this configuration (see FIGS. 7 and 8), the first support 402 may be rotated along a first direction, A, termed herein pitch rotation, a second direction, B, termed herein yaw rotation, and a third direction, C, termed herein roll rotation. This last one being parallel to the device optical axis. Rotations A and B will result in a different walk-off direction of the beam at the focus plane, where the second waveguide is disposed. Persons of ordinary skill in the art will appreciate which rotation should be used to achieve a particular walk-off. Rotation around C allows for alignment of the polarization of the laser beam with the input polarization plane of the isolator.

Even though two spherical mating surfaces are illustrated other slidable surface combination can be used, such as cylindrical or conical surfaces. Also, at least one of the surfaces 404 and 408 may be replaced with an edge for surface-to-edge contact instead of surface-to-surface contact. Additionally, the first support 402 and the second support 406 may have different shapes and orientations. Supports may be biased to a desired initial position. The supports may be accompanied with grooves or other structures to allow for rotation in only certain directions. The supports may also be used for rotation of devices other than steering isolators. For the illustrated examples, the supports 402 and 406 may be fabricated using known MEMS fabrication techniques. In a different embodiment, the optical isolator could also be oriented by plastically deforming the support material. In another embodiment the support material can be deformed elastically and then the position of the steering element can be fixed relative to the substrate. Of course one can combine some or all of the previous embodiments together.

Figure 5:
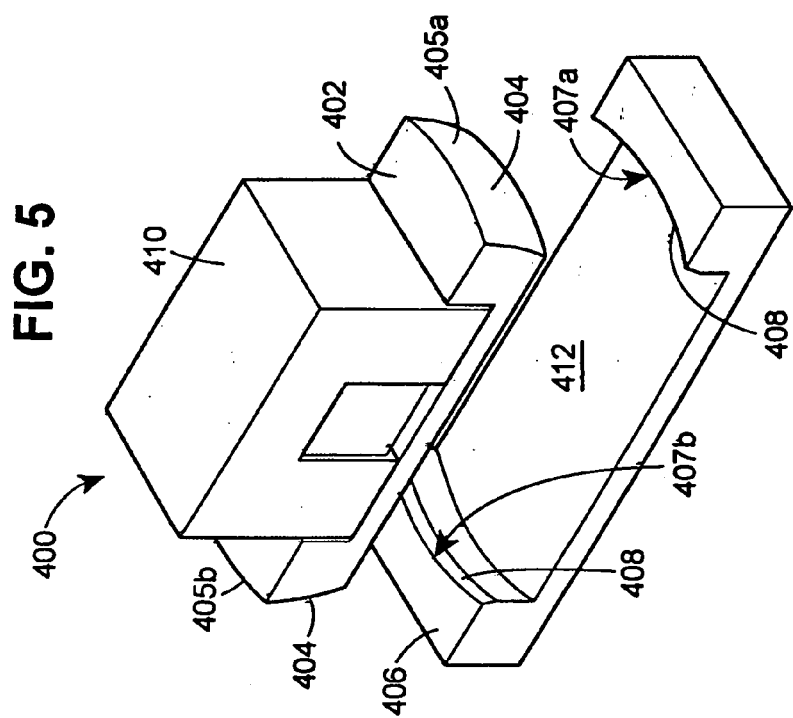
FIG. 5 is an illustration of an example optical isolator having a first and second isolator substrate and capable of rotational movement.
Figure 7:
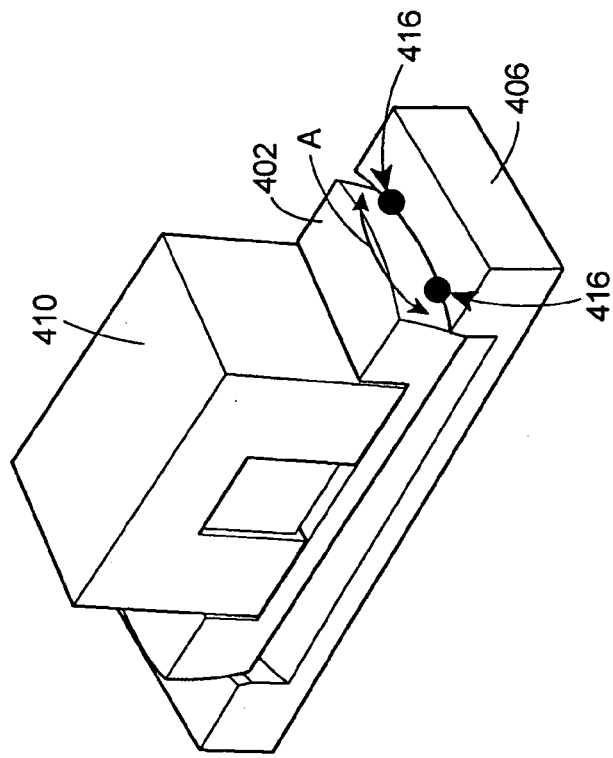
FIG. 7 is an illustration of an example optical isolator that may be rotated for pitch, yaw, and roll rotational movement and then be permanently attached together by laser welding.
Figure 8:
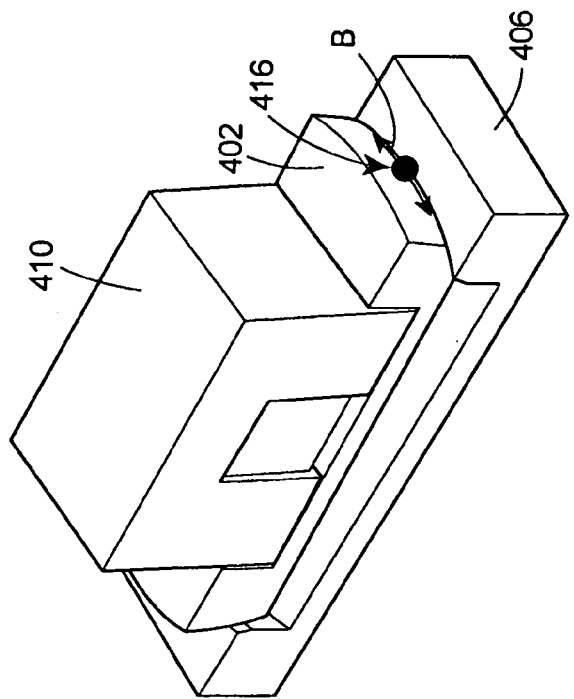
FIG. 8 is an illustration of the optical isolator of FIG. 7 rotated for beam walk-off.

During assembly of an optical module, the second support 406 may be first rigidly mounted to a support or substrate and then the first support 402 is positioned against the second support 406 for movement relative thereto. FIG. 5 illustrates the device 400 before the first support 402 is positioned against the second support 406. FIG. 6 illustrates the same structure with the two surfaces 404 and 408 mated and the optical isolator 410 aligned in a base reference position. FIGS. 7 and 8 show two example orientations of the assembly 400 after rotational movement. In FIG. 7, the first support 402 has been rotated along the directions, A (down) and B (left), the pitch and yaw rotational direction respectively, from the orientation of FIG. 6. In FIG. 8, the first support 402 has been rotated around the same axes in the opposite directions (up and right).

During assembly the first support 402 is rotated around in these A, B, C, directions to optimize coupling into the second waveguide. Once coupling has been optimized, the first support 402 is welded to the second support 406, for example, at weld spots 416. Because of the radial geometry of the supports 402 and 406, the post-weld shift, if any, is unlikely to induce a rotation of the isolator. More generally illustrated below, any post-weld shift will have a much smaller effect on walk-off than in the prior techniques of FIG. 1.

In illustrated example of FIG. 5–8, the center of rotation is located at the center of the optical isolator 410 in order to minimize the reduction in clear aperture when the isolator is tilted. The center of rotation may alternatively be off-center relative to this optical axis. For example, the center of rotation could be coincident with the top of the isolator 410, or even located entirely above it.

Figure 9:
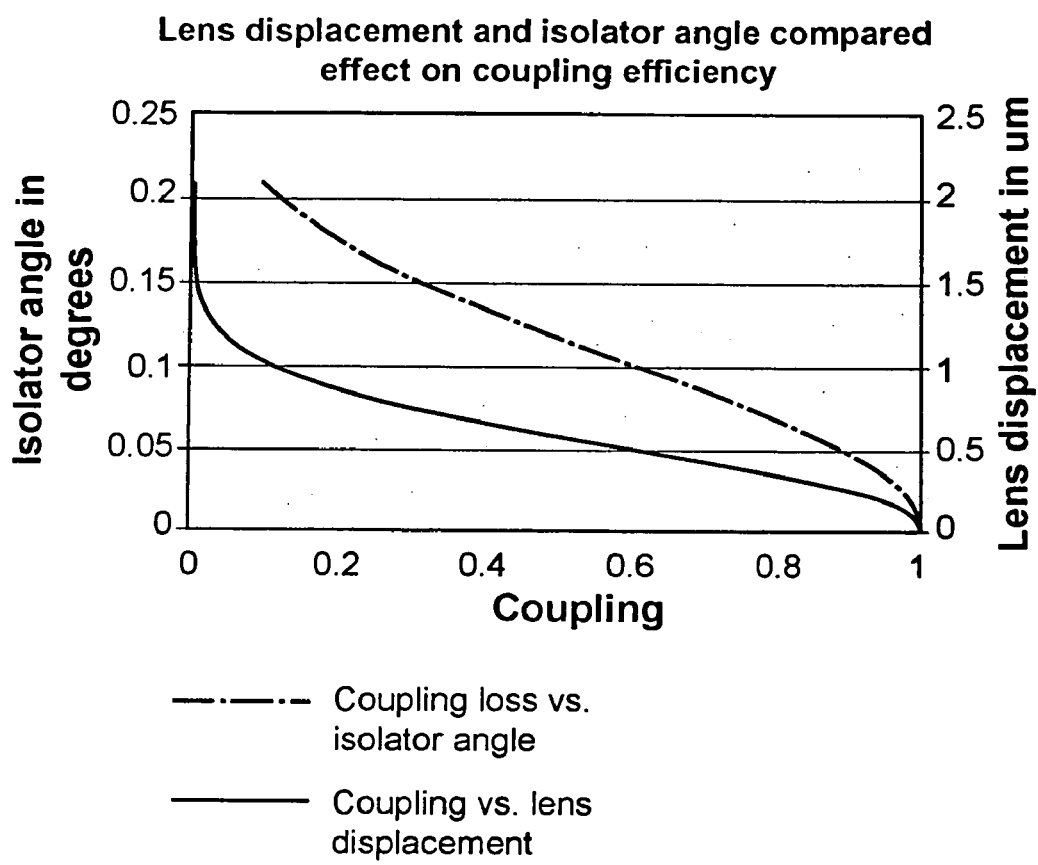
FIG. 9 depicts a plot of lens displacement and isolator angle as a function of coupling efficiency.
Figure 10:
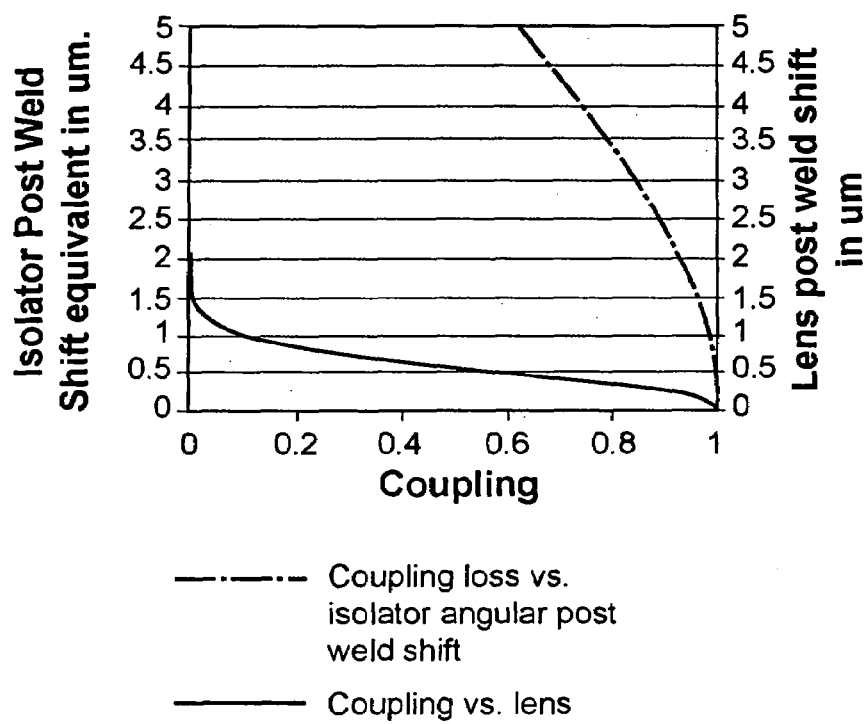
FIG. 10 depicts a plot of coupling efficiency as a function of post-weld shifts in final isolator location.
Figure 11:
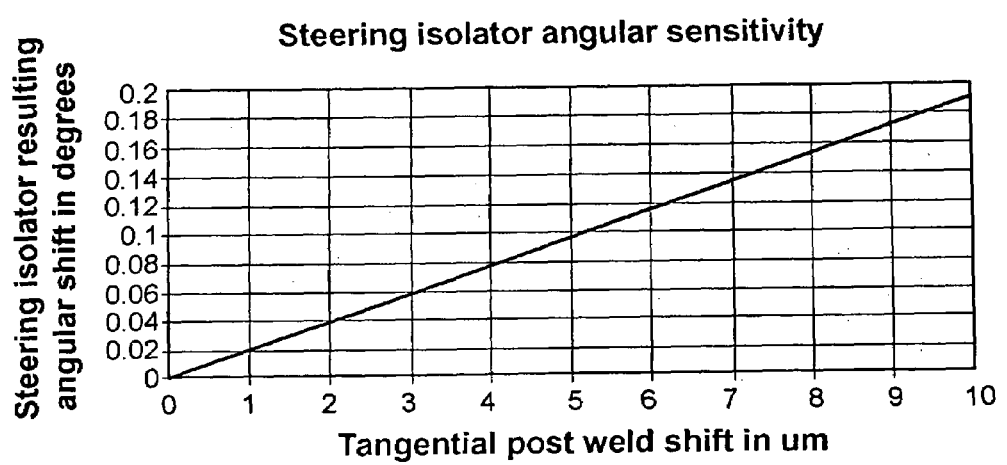
FIG. 11 depicts a plot of the angular sensitivity of an isolator as a function of post-weld shift.

FIGS. 9–11 depict plots of the performance of an example rotationally adjustable optical isolator acting as a beam steering device, such as is shown in FIGS. 2–8. The plots are merely representative, and the exact values would depend upon various design parameters. FIG. 9 illustrates the advantage of using an optical isolator for the beam steering instead of another lens, such as the weak lens 108 illustrated in FIG. 1. The plot of FIG. 9 illustrates coupling loss versus lateral, lens displacement, as well as coupling loss versus angular displacement in an optical isolator. As shown, micron level lateral displacements in the lens result in much higher coupling losses than do angular displacements of the optical isolator. A 1 μm lens shift reduces overall coupling to approximately 0.1 or 10%. While a 0.1° error in the rotation of an optical isolator—an error level easier to avoid than a 1 μm lens displacement—results in reduction to only 60% coupling. In other words, FIG. 9 shows that a rotating optical isolator is much less susceptible to alignment error than the common, two-lens free space coupling systems.

FIG. 10 illustrates a plot of the effect of post weld shift on (1) a laterally movable lens and (2) a rotationally movable optical isolator. A lateral shift in a lens experiences a fast tapering off of coupling. As was illustrated in FIG. 9, a 1 μm shift on a lens reduces coupling to about 10%. While, for the apparatus described in FIGS. 5–8, a 5 μm tangential post-weld shift resulting in a rotation of the isolator, would only cause a drop to approximately 60% coupling. In other words, a rotationally moving optical isolator is less susceptible to coupling error resulting from process shifts and over life displacement. Persons of ordinary skill in the art will appreciate the fact that a pure translation of the isolator along any axis will not cause coupling loss provided no beam clipping occurs.

FIG. 11 is a plot of the optical isolator angular sensitivity showing that the angular shift in degrees of the optical isolator is a linear function of tangential post weld shift. The sensitivity shown is approximately 0.02°/µm shift, which yields a 5 to 1 ratio between a post weld shift and a walk-off displacement. Thus, even relatively sizeable post weld shifts will only result in small walk-off displacements.

The plots of FIGS. 9–11 are examples and persons of ordinary skill in the art will appreciate that the desired coupling values and other values plotted may be adjusted by or depend upon the properties of the optical isolator system and the geometry and size of the support structure.

Although an optical isolator is described, persons of ordinary skill in the art will appreciate that the optical isolator can be replaced by a bulk or layered structure of transparent material having parallel and planar entrance and exit interfaces and an index of refraction different from the index of refraction of the surrounding environment to achieve a walk off of a light beam. Such material includes among others glass, transparent polymers or crystals. It will also be noted that although the entrance and exit planes are to be parallel the optical path between these two planes can be complex.

Figure 12:
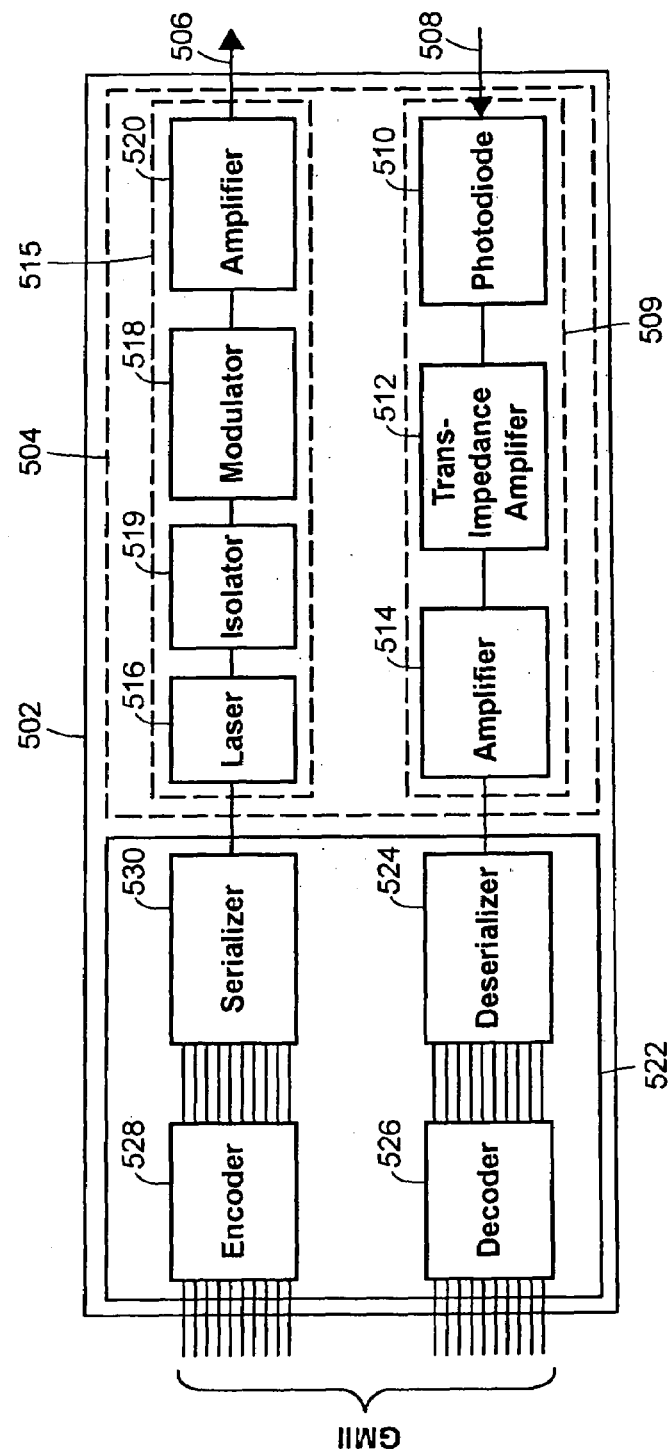
FIG. 12 is a block diagram of a transponder having an optical isolator and which may be used in a communications network.

FIG. 12 shows an example high-level block diagram of transponder 502 that may be used in a communication network to receive and transmit laser signals. Such transponders are useful in dense-wavelength division multiplexing (DWDM) communications networks. The transponder 502 is an example optical device that may employ an optical isolator or device such as those described herein.

In the illustrated example, the transponder 502 includes a transceiver 504 for transmitting and receiving data streams along fibers 506 and 508, respectively. The receiver line 509 includes a photodiode 510, a trans-impedance amplifier 512, and a separate boosting amplifier 514. The transmitter line 515 includes a laser 516 and a modulator 518, with an optical isolator 519, such as those described above, coupling the laser 516 to the modulator 518. The laser 516, modulator 518, and optical isolator 519 may be formed of the assembly 300, for example. The transmitter line 515 further includes an amplifier 520.

While a single transceiver 504 is shown, it will be understood by persons of ordinary skill in the art that the transponder 502 may have multiple transceivers or that each depicted block may represent a bank of blocks; for example, blocks 510 and 516 may be a plurality of photodiodes or lasers, respectively.

The transceiver 504 is connected to a controller 522, which may represent a single application specific integrated circuit (ASIC), multiple integrated circuits, or a microprocessor, for example. The controller 522 may be formed from a microcontroller like the 8051 microcontroller available from Intel Corporation. A microprocessor may also be used, such as any one of the Intel family of microprocessors, including Pentium®, Xeon™, and Itanium™-based microprocessors. Alternatively, a chipset like the LXT16768, LX16769, or LXT16759 products also made by Intel Corporation may be used. For the receiver line 509, the controller 522 includes a deserializer 524 coupled to the amplifier 514 and a decoder 526 coupled to the deserializer 524. For the transmitter line 515, the controller 522 includes an encoder 528 and a serializer 530.

In operation, a multi-channel or single channel data stream is received via the fiber 508. The multi-channel data-stream is coupled into the photodiode 510 for optical-to-electrical signal conversion. Data from the photodiode 510 is coupled to the trans-impedance amplifier 512 and on to the amplifier 514 prior to appearing at the deserializer 524. The deserializer 524 provides a 10 bit signal to decoder 526 that decodes the input signal. The 10 bit word from the decoder 526 may be passed to a Gigabit Media Independent Interface (GMII). For data transmission, input data from the GMII is first encoded by the encoder 528 and then serialized by the serializer 530 to create a transmittable serial bit stream. The output from the serializer 530 controls the output of the laser 516, said output being coupled to the modulator 518 by the optical isolator 519 and then amplified by the amplifier 520 prior to transmission on the fiber 506.

Although the illustration of FIG. 12 is an example, it will be understood by persons of ordinary skill in the art that additional control blocks and routines may be used or that some of the control blocks of FIG. 2 may be eliminated or replaced. For example, the controller 522 may include an internal clock, a clock and data recovery device (CDR), phase control via phase locked loops (PLL), and/or error correction control circuitry. Furthermore, while not necessary, the transponder 502 may be compliant with any known network communications standards of which SONET formats OC-48 (2.5 Gbps), OC-192 (10 Gbps), and OC-768 (40 Gbps) are examples. Of course, the transponder 502 is an example application of the optical isolator and structure described herein. These devices may be implemented in other communication network devices, as well as more generally in optical devices that might benefit from optimized coupling with a laser source. Other examples include integrated modules, wavelength lockers, and tunable laser modules.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What is claimed is:

1. An optical apparatus for coupling an optical beam between a first waveguide generally aligned along an optical axis with a second waveguide, the optical apparatus comprising:
   a substrate rigidly connected to the two waveguides;
   an optical lens for focusing at least a part of the optical beam from the first waveguide onto the second waveguide;
   an optical element having an incidence face substantially normal to said optical axis; and
   an optical element mount including a first support for mounting to the optical element, the first support having a first curved surface, and including a fixed support having a second curved surface in slidable rotational contact with the first surface to provide rotational movement of the optical element, wherein the second surface is a bevel surface at an upper region of the fixed support and retains the first support above a recess opening in the fixed support against vertical movement of the first support relative to the fixed support.

2. The optical apparatus of claim 1, wherein the optical element mount is coupled to the optical element such that the optical element is capable of rotation around a second axis substantially normal to said optical axis.

3. The optical apparatus of claim 1, wherein the first surface and the second surface are in slidable contact with each other for achieving a pitch rotational movement of the optical element.

4. The optical apparatus of claim 1, wherein the first surface and the second surface are in slidable contact with each other for achieving a yaw rotational movement of the optical element.

5. The optical apparatus of claim 1, wherein the first surface and the second surface are in slidable contact with each other for achieving a roll rotational movement of the optical element about the optical axis.

6. The optical apparatus of claim 1, wherein the first curved surface and the second curved surface have a cylindrical shape or a conical shape.

7. The optical apparatus of claim 1, wherein the first surface and the second surface have a spherical shape.

8. The optical apparatus of claim 1, wherein the first waveguide is from a laser diode.

9. The optical apparatus of claim 1, wherein the second waveguide is from an optical modulator.

10. The optical apparatus of claim 1, where the rotational movement is provided by plastically deforming said optical element mount.

11. The optical apparatus of claim 1, where the rotational movement is provided by elastically deforming said optical element mount.

12. The optical apparatus of claim 1, wherein the optical element is an optical isolator.

13. The optical apparatus of claim 12, wherein the optical element mount is an optical isolator mount.

14. The optical apparatus of claim 1, wherein the first surface and the second surface maintain slidable contact throughout the full range of rotational movement of the optical element.

15. The optical apparatus of claim 1, wherein the slidable contact between the first surface and the second surface allows for rotational movement in three orthogonal dimensions.

16. An optical isolator for coupling an optical beam from a first waveguide to a second waveguide, the optical isolator comprising:
a first substrate having a compliant surface and attached to an isolator element, the compliant surface being a first curved surface; and
a second substrate having a receiving surface that is a bevel curved surface positioned at an upper region of the second substrate and that is in slidable rotational contact with the compliant surface for rotational movement of the first substrate, wherein the bevel curved surface retains the first substrate against vertical movement of the first substrate relative to the second substrate.

17. The optical isolator of claim 16, wherein the optical isolator comprises a permanent magnet.

18. The optical isolator of claim 16, wherein the first curved surface and the bevel curved surface are spherical surfaces.

19. The optical isolator of claim 16, wherein the first curved surface and the bevel curved surface are cylindrical surfaces or conical surfaces.

20. The optical isolator of claim 16, wherein the first substrate is mounted to the second substrate for pitch rotation, yaw rotation or roll rotation.

21. A focusing apparatus for coupling an optical beam from a first optical device to a second optical device, the apparatus comprising:
a substrate disposed between the first optical device and the second optical device;
a lens mounted to the substrate;
a first isolator support having a compliant surface, the compliant surface being a first curved surface;
an optical isolator mounted in the first isolator support; and
a second isolator support having a receiving surface that is a bevel curved surface and that is in slidable rotational contact with the compliant surface to allow the first isolator support to rotate relative to the lens, the second isolator support being mounted to the substrate adjacent the lens, wherein the bevel curved surface retains the first isolator support above a recess opening of the second isolator support against vertical movement of the first isolator support relative to the second isolator support.

22. The focusing apparatus of claim 21, wherein the compliant surface and the receiving surface are complementary to allow for pitch, yaw, and roll rotational movement.

23. A transponder comprising:
a substrate;
a laser source disposed on the substrate, the laser source being capable of producing a laser beam;
a modulator disposed on the substrate; and
an optical isolator disposed on the substrate to couple the laser beam from the laser source to the modulator, the optical isolator having a first support that is rotationally adjustable relative to the laser source to selectively couple the laser beam into the modulator, wherein the first support has a compliant surface that is a first curved surface, the optical isolator having a second support having a receiving surface that is a bevel curved surface in slidable rotational contact with the compliant surface to allow the first support to rotate relative to the laser source, wherein the bevel curved surface retains the first support above a recess opening in the second support against vertical movement of the first support relative to the second support.

24. The transponder of claim 23, wherein the compliant surface and the receiving surface have a spherical, cylindrical or conical shape.

25. The transponder of claim 23, wherein the first support is coupled to the second support for pitch rotation or yaw rotation.

* * * * *